US007904892B2

(12) United States Patent
Babb, II et al.

(10) Patent No.: US 7,904,892 B2
(45) Date of Patent: Mar. 8, 2011

(54) SYSTEMS AND METHODS FOR IDENTIFYING AND DISPLAYING DEPENDENCIES

(75) Inventors: Robert G. Babb, II, Golden, CO (US); Michael H. Parry, Castle Rock, CO (US); Jason S. Byassee, Denver, CO (US); Ted L. Meyers, Aurora, CO (US); David R. Mooney, Centennial, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 1463 days.

(21) Appl. No.: 11/326,902

(22) Filed: Jan. 6, 2006
(Under 37 CFR 1.47)

(65) Prior Publication Data
US 2007/0162903 A1 Jul. 12, 2007

(51) Int. Cl.
G06F 9/45 (2006.01)
G06F 9/44 (2006.01)
(52) U.S. Cl. .......... 717/144; 717/105; 717/133; 717/157
(58) Field of Classification Search .................. None
See application file for complete search history.

(56) References Cited

U.S. PATENT DOCUMENTS

| 5,634,113 | A  * | 5/1997  | Rusterholz ............. 716/13 |
| 7,441,230 | B2 * | 10/2008 | Kainz et al. ............ 717/105 |
| 7,620,947 | B2 * | 11/2009 | Krishnaswamy .......... 717/157 |
| 7,627,861 | B2 * | 12/2009 | Smith et al. ............ 717/144 |
| 2002/0097253 | A1 * | 7/2002 | Charisius et al. ........ 345/700 |
| 2003/0067481 | A1 | 4/2003 | Chedgey et al. |
| 2003/0135724 | A1 * | 7/2003 | Krishnamurthy et al. .... 712/245 |
| 2004/0205726 | A1 * | 10/2004 | Chedgey et al. ......... 717/125 |
| 2004/0268308 | A1 * | 12/2004 | Srivastava et al. ....... 717/120 |
| 2005/0076328 | A1 * | 4/2005 | Berenbach et al. ....... 717/104 |
| 2006/0031823 | A1 * | 2/2006 | Vasilevskiy et al. ...... 717/144 |
| 2006/0064632 | A1 * | 3/2006 | Vignet ................ 715/502 |
| 2006/0070047 | A1 * | 3/2006 | Narayanasamy et al. .... 717/144 |
| 2006/0206872 | A1 * | 9/2006 | Krishnaswamy .......... 717/133 |

OTHER PUBLICATIONS

Tuura et al., "Ignominy: A Tool for Software Dependency and Metric Analysis with Examples from Large HEP Packages", International Conference on Computing in High Energy and Nuclear Physics, Sep. 2001.*
Elmer, "Classycle.graph Interface Attributes", Nov. 10, 2004, retrieved Jul. 8, 2009, Internet Archive, <http://web.archive.org/web/20041110203943/classycle.sourceforge.net/apidoc/index.html>.*
Ford et al., "Data Structures with Java", Prentice-Hall, 2004, pp. 763-764.*
Immorlica et al., "Cycle Cover with Short Cycles", Symposium on Theoretical Aspects of Computer Science, Feb. 2005, pp. 641-653.*

(Continued)

Primary Examiner — Thuy Dao
(74) Attorney, Agent, or Firm — Tarolli, Sundheim, Covell & Tummino LLP

(57) ABSTRACT

Systems and methods are provided for identifying and displaying dependencies. One aspect of the invention comprises a system having a dependency parser that parses components of a system with dependencies and generates a plurality of component dependency pairs associated with the components, and a component dependency graph generator that generates a dependency directed graph from the plurality of dependency pairs. The system further includes a component levels and cycles analyzer that traverses the dependency directed graph to identify dependencies, strong components and component dependency levels associated with the dependency directed graph, and a graphical user interface that provides a tree view illustrating a dependency tree of the identified dependencies over the identified component dependency levels.

30 Claims, 6 Drawing Sheets

OTHER PUBLICATIONS

Chris Chedgey, "Structuring a Code-base with Headway reView", White Paper, May 2002, retrieved Oct. 22, 2009 from <http://www.headwaysoftware.com>, pp. 1-11.*

L. A. Tuura, "Ignominy: Tool for Analysing Software Dependencies and for Reducing Complexity in Large Software Systems", Nuclear Instruments and Methods in Physics Research A, vol. 502, Apr. 2003, pp. 684-686.*

"Service dependency graph: an efficient model for hardware/software interfaces modeling and generation for SoC design", Sarmento et al., Sep. 2005, pp. 261-266, <http://delivery.acm.org/10.1145/1090000/p261-sarmento.pdf>.*

"Syntactic parser combination for improved dependency analysis", F. Brunet-Manquant, Aug. 2004, pp. 24-31, <http://delivery.acm.org/10.1145/1630000/1621449/p24-brunet-manquant.pdf>.*

"Context-Aware Scheduling Analysis of Distributed Systems with Tree-Shaped Task-Dependencies", Henia et al., Mar. 2005, pp. 480-485, <http://delivery.acm.org/10.1145/1050000/1049153/228810480.pdf>.*

Classycle: *"What Classycle's Analyser Measures"*; http://classycle.sourceforge.net/measures.html; Dec. 5, 2005; pp. 1-3.

Headwaysoftware; *"Headway Review—Reverse Engineer and Understand with the Leading Software Visualization"*; http://www.headwaysoftware.com/html/visual.htm; Sep. 1, 2005; pp. 1-2.

Headwaysoftware; *"Headway Software—Source Code Metrics for Code Reviews"*; http://www.headwaysoftware.com/html/analysis.htm; Sep. 1, 2005; pp. 1-2.

Tom Mens; *"Analysing Refactorings with Graph Transformation Theory"*; http://w3.umh.ac.be/genlog; May 27, 2005; Eindhoven, Benelvol 2005; pp. 1-18.

Turra L et al: "Ignominy: a tool for software dependency and metric analysis with examples from large HEP packages" Computing in High Energy and Nuclear Physics 2001 Conference Proceedings, [Online] Sep. 4, 2001, pp. 1-6 XP002462305 Retrieved from the Internet: URL:http://www.ihep.ac.cn/{chep01/paper/8-024.pdf> [retrieved on Dec. 13, 2007].

Anonymous: "CHEP'01 Scientific Program—Track8: Software Methodologies and Tools" Internet Article, [Online] XP002462306Retrieved from the Internet: URL:http://www.ihep.ac.cn/{chep01/schedule/track8.htm> [retrieved on Dec. 13, 2007].

European Search Report for corresponding EP07000163.1-1243 completed Dec. 13, 2007 by Ronald de Man.

* cited by examiner

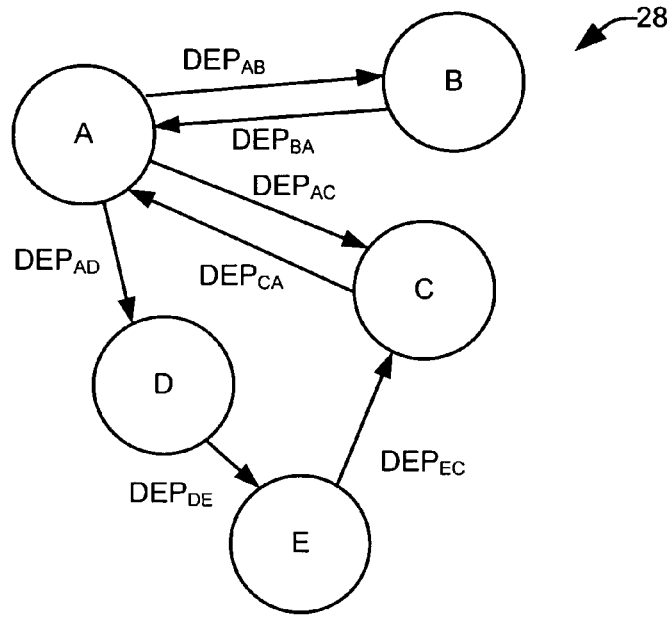
FIG. 3
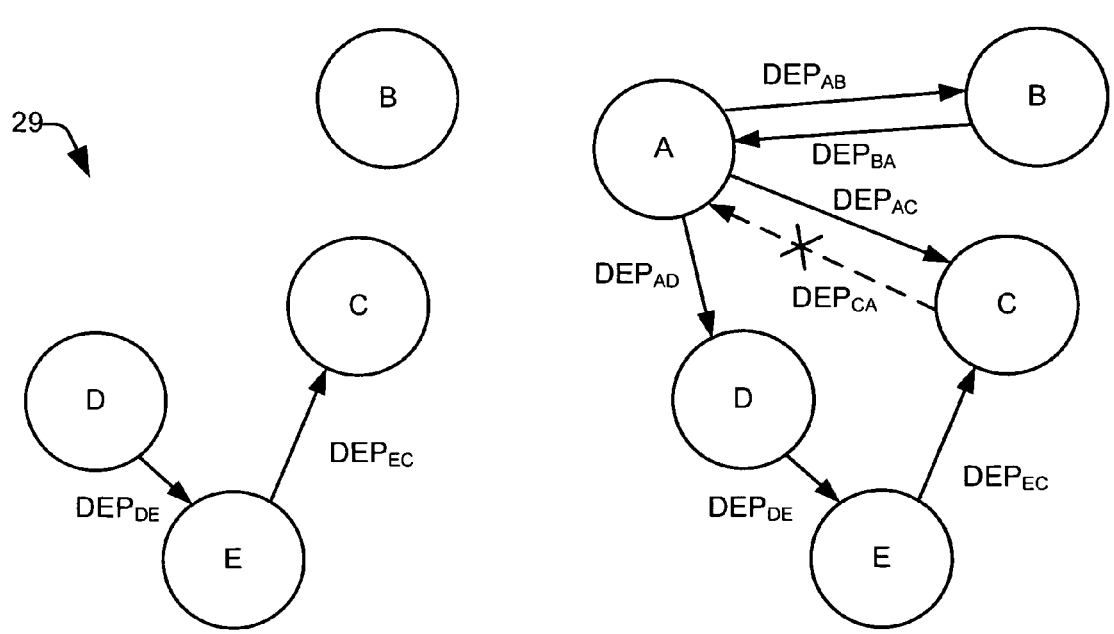
FIG. 4
FIG. 5 ns, and more particularly to systems and methods for iden-
SYSTEMS AND METHODS FOR IDENTIFYING AND DISPLAYING DEPENDENCIES This invention was made with Government support. The Government has certain rights in this invention.

TECHNICAL FIELD

The present invention relates generally to software analysis tools, and more particularly to systems and methods for identifying and displaying dependencies among system components.

BACKGROUND

Many large complex systems include components that form the complex system. These components can have logical, temporal, and other kinds of dependencies between the components that form the system. For example, for a given component to complete a task from start to end, it may need to call upon other components, or chains of components, in order to perform required processing, or the given component may require information or data from one or more other components or a chain of components for completion of the task. Large, complex chains of such dependencies can develop, especially as a system increases in size and complexity. A particular kind of dependency, called a circular dependency, or cycle, when combined with other distinct circular dependencies, can lead to large, tangled webs of dependencies that can be particularly difficult to identify and understand. A large complex system that includes dependencies between components can be, for example, a transportation system, a business workflow process, an inventory control system, a manufacturing system, a large complex software system or a variety of other systems.

Most large software systems are susceptible to a form of software design defect due to architectural complexity. As these software systems evolve over time, changes to existing software components (such as those necessary to fix problems or to meet new requirements) are required. In a complex network of interdependent and cyclically dependent modules, changes to one component can often exhibit a ripple effect across a software architecture and impact other seemingly non-related components. Tracking down and understanding these ripple effects can be very difficult to do without the assistance of software tools. Since many developers are typically involved in the development of large, complex software systems, very few if any developers may have knowledge of the particulars of the entire application's source code and all the relationships between components that may exist at any particular stage of development of the system. As the size and complexity of a software system increases, the result can be that it becomes increasingly difficult and costly to perform maintenance and enhancement, which can lead to a large increase in the number, severity, scope and cost to repair defects.

A major root cause of the increased difficulty in software maintenance, enhancement and defect corrections lies in the development over time of complex webs of dependency relationships among the software components or modules that make up the system. These complex webs evolve for many reasons, including complexity of the problem, developer turnover, and lack of design expertise. Cyclic dependencies in particular can substantially increase the difficulty when software changes are required since a change in a given module that is part of one or more cyclic dependencies may require changes in many other modules in any of the cycles that include the given component. Changes to any module that is not part of a cyclic dependency, but that depends upon any module contained in a cyclic dependency, will in general require examination of all modules in the relevant cyclic dependencies. For example, the simplest form of a cyclic dependency occurs when a first module needs information from a second module in order to compile and run, and vice versa. When the cyclic dependency relationships involve, for example, 100 or 150 modules, the effect is often a substantial multiplier on the efforts required to fix any module within the cyclic dependency chain or any module that depends upon a module in the cyclic dependency chain. Therefore, it can be especially desirable to reduce or eliminate large webs of cyclic dependencies in software systems, but at the same time these large webs are the most difficult to identify and understand in order to correct these large cyclic dependencies. There are several commonly understood ways to redesign software systems to avoid or reduce cyclic and other types of unnecessarily complicated patterns of dependencies.

SUMMARY

The present invention relates to systems and methods for identifying and displaying dependencies. One aspect of the invention comprises a system for identifying and displaying dependencies. The system comprises a dependency parser that parses components of a system with dependencies and generates a plurality of component dependency from/to pairs, and a component dependency graph generator that generates a dependency directed graph from the plurality of dependency from/to pairs. The system further comprises a component levels and cycles analyzer that traverses the dependency directed graph to identify dependencies, strong components and component dependency levels associated with the component dependency directed graph, and a graphical user interface that can provide a tree view, a table view, and an inverse tree view, illustrating the identified dependencies over the identified component dependency levels.

Another aspect of the present invention relates to a computer readable medium having computer executable components. The computer executable components comprise a dependency parser that parses system components and generates a plurality of component dependency from/to pairs associated with the system components, a component dependency graph generator that generates a component dependency directed graph from the plurality of component dependency from/to pairs, and a component levels and cycles analyzer that traverses the directed graph and can identify non-cyclic dependencies, external library dependencies, cyclic dependencies, system component dependency levels, and covering cyclic sets for one or more strong components. The component levels and cycles analyzer can employ a directed graph shortest path algorithm in traversing the dependency directed graph to identify a set of covering cycles for each strong component. The computer executable components further comprise a metric engine that can generate a plurality of dependency metric values from the dependency directed graph, and a graphical user interface that can provide selectability between a tree view that can illustrate a dependency tree of non-cyclic dependencies, external dependencies, cyclic dependencies and cyclic sets associated with the one or more strong components over the identified system component dependency levels, a table view that illustrates the plurality of metric values for all directories and sub-directories, and an inverse tree view that can illustrate all of the components that directly depend upon a component or external library.

Another aspect of the invention relates to a method for identifying and displaying dependencies in software components. The method comprises parsing a plurality of software components contained within a tree of one or more directories and generating a plurality of component dependency from/to pairs associated with the plurality of software components, generating a component dependency directed graph from the plurality of component dependency from/to pairs, and traversing the dependency directed graph to identify non-cyclic dependencies, cyclic dependencies and covering cyclic sets associated with one or more strong components and system component dependency levels associated with the software components. The method can further comprise displaying a tree view that can illustrate a dependency tree of the identified non-cyclic dependencies, cyclic dependencies and covering cyclic sets associated with strong components over the identified component dependency levels. The method can further comprise displaying a table view that illustrates the plurality of metric values across an entire directory tree (e.g., all directories and sub-directories), and an inverse tree view that illustrates the components that directly depend upon a component or external library.

BRIEF DESCRIPTION OF THE DRAWINGS

FIG. 3 illustrates a component dependency graph of a non-singleton strong component in accordance with an aspect of the present invention.

FIG. 4 illustrates a modified dependency graph of the strong component of FIG. 3 upon removal of a singleton strong component A.

FIG. 5 illustrates a dependency graph of the strong component of FIG. 3 upon removal of the dependency arc ($DEP_{CA}$) from component C to component A.

DETAILED DESCRIPTION

Figure 1:
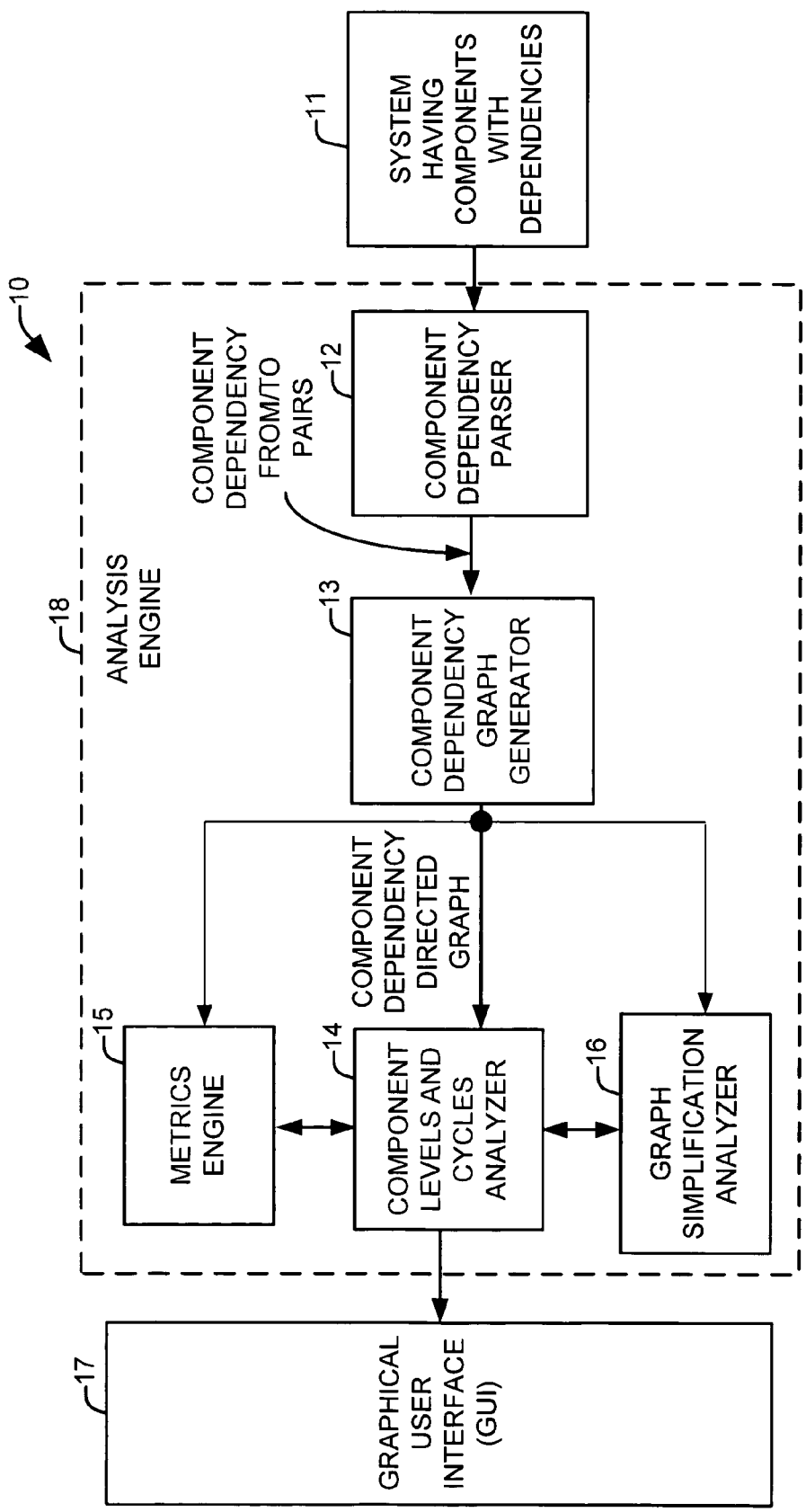
FIG. 1 illustrates a block diagram of a system for identifying, analyzing, and displaying dependencies of components in accordance with an aspect of the present invention.

The present invention relates to systems and methods for identifying and displaying dependencies (e.g., cyclic dependencies, non-cyclic dependencies, external dependencies) between components and identifying corresponding dependency levels. A component is defined as a unit task, of a system having a plurality of unit tasks, that can be performed or executed from a starting point to an end point and may or may not need information from one or more other components (i.e., dependencies) in order to complete. Although many of the examples are illustrated with respect to software components (otherwise referred to as functions, procedures, classes, and files, among other terms) of a software system within a complete tree of one or more directories, the systems and methods are also generally applicable to a variety of complex systems that includes dependencies between components, such as transportation systems, business workflow processes, project management systems, inventory control systems, and manufacturing systems, to name a few. The present invention is useful not only for the re-design and simplification of existing systems, but is also useful from the beginning of system development to guide software architects, designers, and programmers and help them avoid unnecessary complexity as systems are being constructed.

A software component as defined herein includes data structures, classes, and interfaces for a variety of different programming languages, a variety of different compiled formats and a variety of different external library formats. In one aspect of the invention, the system and method can identify and display strong components in addition to identifying and displaying cyclic sets and individual covering cycles that comprise strong components. A cycle is a path within the directed graph of component dependencies between two or more components that begins and ends at the same component, and that contains no duplicated components. The presence of cycles within a software system often indicates tight coupling between software components that can greatly increase system complexity and costs associated with system testing, system maintenance and system enhancement. A strong component can consist of either a single node (referred to as a "singleton strong component", or just as a "component", when the meaning is clear), or can consist of a plurality of singleton strong component nodes where each node (e.g., file, class, method, procedure, function, interface, data structure, etc.) is reachable from any other node within the strong component by following a dependency chain. A cyclic set as used here is a set of cycles that have a common vertex or node and that contain no duplicate cycles, where two cycles are considered equivalent if they differ only in the choice of the start/end node.

The present invention relies upon calculation of several metrics based on the graph structure of the dependencies. Cumulative Component Dependency (CCD), is the sum over all components $C_i$ in a subsystem of the number of components needed in order to test each $C_i$ incrementally. Derived metrics based on CCD are: the average component dependency, ACD=CCD/n, and the normalized cumulative component dependency, NCCD, which is the CCD of the system at hand divided by the CCD of a balanced binary dependency tree with the same number of components of the system under consideration.

A software system design aspect that often leads to increased regression testing effort and cost is due to the presence of dependency cycles (systems whose dependency structure allows traversal from a starting component through a series of other components, and then back to the starting component). This increased testing effort, over a software subsystem with the same number of components, but no cycles, occurs because no component in a cycle can be tested in isolation. A change to any one of the components requires verification that all of the other components in the cycle still behave correctly. If there are N components in a cycle, then N times N (N squared) tests must be run, instead of the smaller number of tests (CCD) which would be required if the components dependency structure contained no cycles. Systems with very high NCCD tend to have one or more areas of complex cyclic dependencies and typically require increased testing efforts relative to systems with smaller NCCDs. Such systems are also typically much more difficult and expensive to maintain because the benefits of modularity are greatly diminished by the "ripple effect" of changes in one module potentially impacting many other modules.

The present invention provides a powerful diagnostic tool that can handle very large, complex (software) dependency structures and can help focus software developer's and architect's attention on problematic areas of especially high complexity (corresponding to high Normalized Cumulative Component Dependency (NCCD)). The invention can also provide programmers and system designers with the relevant low-level details, such as determining which components are involved in a cycle, and in what order, and what other parts of the system depend upon the cycle. The invention can also provide a set of covering cycles for each strong component, where short cycles are preferred over longer ones, no covering cycle is redundant (differing only in the choice of begin/end node) and all dependency arcs within the strong component are covered by at least one of covering cycles. The invention can also provide the reasons that the dependency exists. For example, "Component A depends upon Component B because A calls the function x contained within B". The invention can also provide an inverse dependency view, in order to answer questions such as "What are all of the Components that depend upon Component C?". The present invention thus provides a simple, but powerful tool for understanding and modifying, avoiding or redesigning the dependency structures that lead to high system complexity and increased development and maintenance cost.

FIG. 1 illustrates a system 10 for identifying and displaying dependencies of components in accordance with an aspect of the present invention. The system 10 can be a software tool that resides on a computer executable medium, a plurality of software components distributed across one or more computer executable mediums (e.g., computer systems), hardware components or a combination of hardware and software components. The system 10 includes an analysis engine 18 for identifying cyclic, non-cyclic and external dependencies of components associated with a system having components with dependencies 11, and a graphical user interface 17 for displaying the identified dependencies and metric and graph simplification information. The analysis engine 18 can employ graph theory to traverse and build cyclic dependency representations found in the system 11 (e.g., source code and/or compiled code files), and metric analysis to generate dependency metrics. The system 11 can be a software system having a plurality of software components distributed across a complete directory tree. The plurality of software components can be in the form of source code, compiled (linkable) code and/or external libraries.

The analysis engine 18 includes a component dependency parser 12, a component dependency graph generator 13, a component levels and cycles analyzer 14, a metrics engine 15 and an graph simplification analyzer 16. The component dependency parser 12 analyzes through the plurality of components to determine component dependencies from/to pairs, which are provided to the component dependency graph generator 13. The component dependency graph generator 13 generates a component dependency directed graph that is used to determine component dependency levels and cycles and associated dependencies of the components contained within the system 11. For example, in a software system, the component dependency parser 11 can parse object code (e.g., C/C++ object code files and libraries, files whose names by convention typically end in .o, .a, and .so), source code (e.g., C/C++ header files (.h) and other C/C++ source code (.c, .cpp)), and compiled JAVA byte code files (e.g., class files and jar and zip pre-compiled JAVA libraries) across a complete directory tree. It is to be appreciated the system 10 can be employed to identify and display dependencies associated with a variety of different software component types. The component dependency graph generator 13 provides the component dependency directed graph to the metrics engine 15, the component levels and cycles analyzer 14 and the graph simplification analyzer 16.

The graph simplification analyzer 16 is coupled to the component levels and cycles analyzer 14 and can help determine the components and dependencies that, if eliminated by software re-organization or redesign, would lead to the greatest simplification of the overall system structure. For example, in one aspect of the invention, the graph simplification analyzer 16 can identify an ordered list of components to be considered for simplifying a system with dependencies by determining a best fragmenter or an ordered list of fragmenters associated with a given strong component. The best fragmenter or list of fragmenters is determined by the following technique. Each node within a given strong component (along with all corresponding intra-strong component dependencies) is temporarily removed and the size of the largest remaining strong component within the original strong component is recorded. This list of nodes and remaining strong component sizes is then ordered by size. The node(s) with the smallest corresponding remaining strong component sizes are the best fragmenters for the strong component. Other nodes in the list are other possible fragmenters to be considered if the software re-designer intends to remove a node from strong component in order to simplify the system. In another aspect of the present invention, the potential nodes to be removed from the strong component are ranked by the effect on the overall system NCCD if they (and all of their dependency arcs) were removed from the system.

Figure 2:
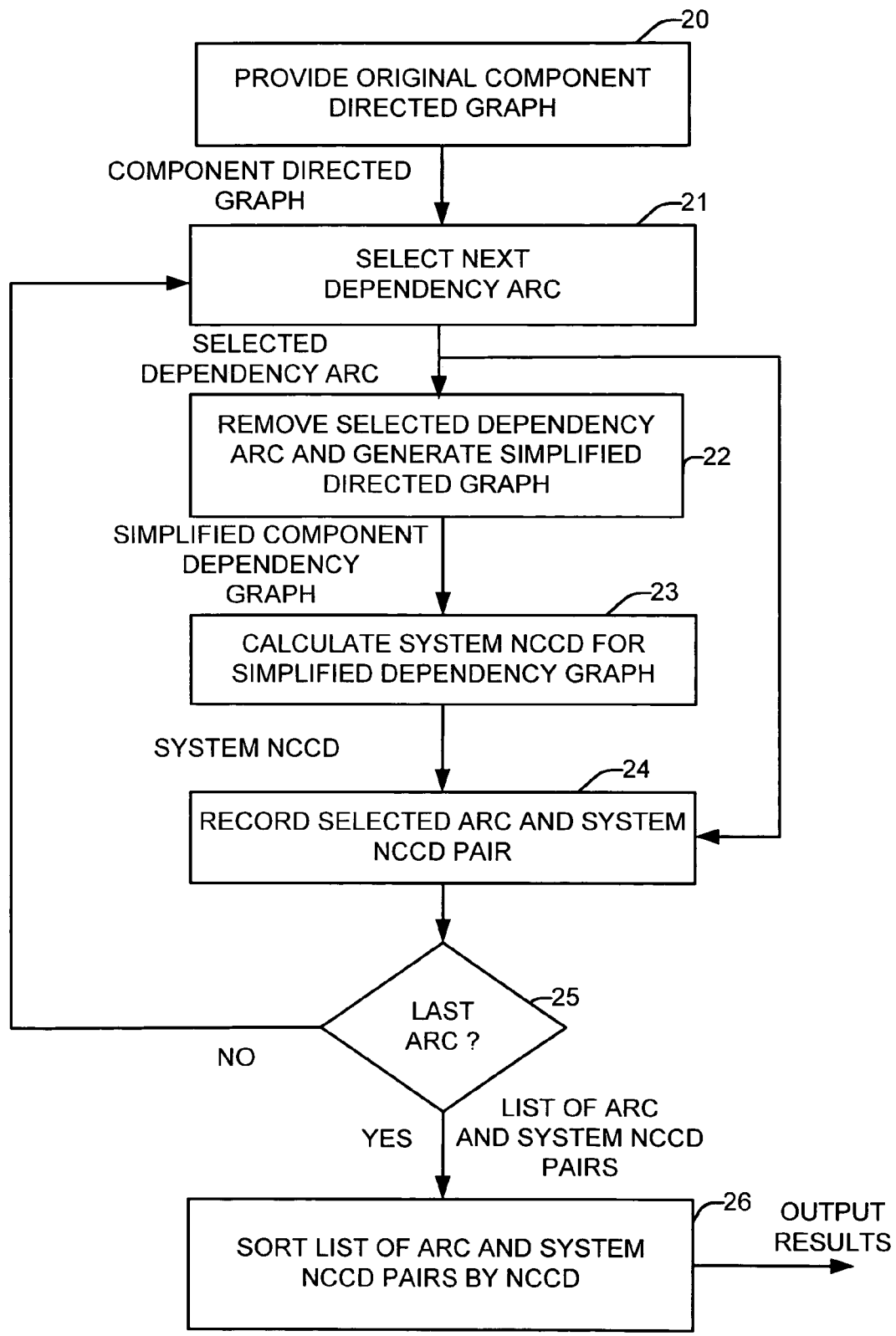
FIG. 2 illustrates a method for performing a graph simplification analysis in accordance with an aspect of the present invention.

In yet another aspect of the invention, the graph simplification analyzer 16 can help determine the dependency or dependencies that, if eliminated by software re-organization or redesign, would lead to the greatest simplification of the overall system structure, as measured by overall system NCCD. Each dependency arc within the entire system is temporarily removed and the effect on the overall system NCCD is recorded. This list of arcs and corresponding overall system NCCDs is then ordered by increasing NCCD. The dependency arc(s) with the smallest corresponding overall system NCCD are the best dependency simplifiers for the system. Other dependency arcs in the list are other possible dependency simplifiers to be considered if the software designer intends to re-design the system to remove a single dependency in order to simplify the system. This method is illustrated in FIG. 2.

The metrics engine 15 uses the component dependency directed graph to generate a plurality of dependency metrics. For example, for a software system, the plurality of dependency metrics can include NCCD values for a given directory or package, a number of components in a directory, a number of levels in a directory, a number of strong components in a directory, and a number of members involved in the strong components. The metrics engine 15 can provide a (table view) summary of software metrics for various libraries, packages, directories, or other subsets of the system. For directories or parent packages with subdirectories, the metrics engine 15 can provide such information as the number of strong components within the parent directory or package and the cumulative total of intra-package strong components in all subdirectories. Additionally, the metrics engine 15 can calculate the number of strong components across directories for parent packages and the number of members across directories for parent packages. The metric engine 15 provides the metrics to the component levels and cycles analyzer 14, which is responsible for rendering the information via the graphical user interface 17.

The component levels and cycles analyzer 14 analyzes the component dependency directed graph to identify cyclic and non-cyclic dependencies, sets of covering cycles (cyclic sets) within each strong component and system component dependency levels associated with system components, where any required external libraries are assigned level number 0, and each strong component is assigned a level number that is the smallest to which it can be assigned and still preserve all of the system dependencies, e.g. a component is assigned level N if it depends upon at least one component at level N−1 (and possibly other components at levels N−2, N−3, etc.). All of the components within a non-singleton strong component are assigned the same level number, since for the purpose of determining levels, a strong component is treated as if it were a singleton strong component with the union of the set of cross strong component dependencies that enter or leave any singleton member of the strong component.

The component levels and cycles analyzer 14 determines a set of covering cycles for each strong component with the aid of a shortest path algorithm on directed graphs as follows. The elementary cycles that make up the covering cyclic sets of a strong component are identified with the aid of a shortest path algorithm for directed graphs, as follows. The immediate successors of each singleton component within the strong component are considered in turn, and a shortest path, following the dependency arcs of the directed graph, back to the selected singleton component is determined. If this shortest path has not been seen before for any singleton component within this strong component, (where two paths (cycles) that differ only by their begin/end node are considered identical), it is added to the list of cycles (the cyclic set) for the selected singleton component. By the definition of strong component, there will always be a shortest path back to the selected node, although it may not be unique. If more than one shortest path exists, the process chooses one arbitrarily. It is to be appreciated that once a covering cycle has been identified for a given cyclic set of a strong component, the identified covering cycle will not be identified for a subsequent cyclic set. This process is repeated for each of the singleton components that make up the given strong component. The component levels and cycles analyzer 14 also traverses the directed graph to identify all non-cyclic dependencies and external dependencies. A person skilled in graph theory will recognize that many other strategies for determining and displaying covering cyclic sets are possible, and are within the scope of the present invention.

The component levels and cycles analyzer 14 provides the identified strong components, the dependency levels, the cyclic dependencies, cyclic sets and best fragmenters lists (for strong components), the best dependency simplifiers list, etc., to a graphical user interface (GUI) 17 for display. The component levels and cycles analyzer 14 also provides the non-cyclic dependencies, external dependencies and the plurality of dependency metrics to the GUI 17. The GUI 17 can provide a table view of dependency metrics, a tree view illustrating a dependency tree of the dependencies, dependency cycles and cyclic sets over the dependency levels, an inverse dependency view, and other information. The GUI 17 also has the capability of providing before and after views (or a history of views) that can show the effect over a series of software re-design or restructuring steps on any of the information that the GUI can display.

The tree view also identifies the strong components with associated dependency cycles, cyclic sets and associated strong component and dependency arc simplification information. The tree view can also be configured to display dependency definitions that provide an explanation of why a given dependency exists (e.g., a call to a method in a component, an instantiation of a component, etc.). The tree view can further identify all of the non-cyclic and external dependencies for the system under analysis. The tree view can be configured to further identify the exact set of causes or reasons for each dependency found, analyzed, and displayed. Although, not illustrated, the GUI 17 can be configured to display an inverse tree view that indicates for each given component all components that are dependent upon the given component.

FIG. 2 illustrates a method for performing a graph simplification analysis to identify a list of the best dependency arc simplifiers for a system with dependencies in accordance with an aspect of the present invention. The method begins at 20, where an original component dependency directed graph for a system with dependencies is provided. At 21, a next dependency arc is selected for temporary removal from the component dependency graph. At 22, the selected dependency arc is removed and a simplified component dependency directed graph is identified. At 23, the system NCCD is calculated for the simplified dependency graph. At 24, the selected dependency arc and system NCCD pair is recorded. The selected dependency arc is provided from 21 and the system NCCD for the simplified dependency graph associated with removal of the selected dependency arc is provided from 23. At 25, the method determines if the system NCCD for the last arc has been calculated. If the system NCCD for the last arc has not been calculated (NO), the method returns to 21 to select the next dependency arc for trial removal from the original input component dependency directed graph, and the process repeats. If the system NCCD for the last arc has been calculated (YES) at 25, the method proceeds to 26. At 26, the list of selected dependency arc and NCCD pairs are ordered by NCCD (e.g., smallest first) and provided as output. The list is ordered by the degree to which the overall system NCCD would be reduced if the associated dependency arc were eliminated to redesign the system.

FIGS. 3-5 illustrate various examples of both singleton and non-singleton strong components, and the effect of removing a singleton strong component and associated dependency arcs. FIG. 3 illustrates a dependency graph of a non-singleton strong component 28 in accordance with an aspect of the present invention. The strong component 28 consists of 5 singleton strong components A, B, C, D, and E, and 7 dependency arcs. The strong component 28 includes a cycle A-B-A, a cycle A-C-A and a cycle A-D-E-CA. The cycle A-B-A, cycle A-C-A and cycle A-D-E-C-A form a covering cyclic set for the strong component. The cycle A-B-A includes a dependency arc from component A to component B ($DEP_{AB}$) and a dependency arc from component B to component A ($DEP_{BA}$). The cycle A-C-A includes a dependency arc from component A to component C ($DEP_{AC}$) and a dependency arc from component C to component A ($DEP_{CB}$). The cycle A-D-E-C-A includes a dependency arc from component A to component D ($DEP_{AD}$), a dependency arc from component D to component E ($DEP_{DE}$), a dependency arc from component E to component C ($DEP_{EC}$), and a dependency arc from component C to component A ($DEP_{CA}$).

FIG. 4 illustrates a modified dependency graph 29 of the non-singleton strong component 28 upon removal of component A and associated dependency arcs $DEP_{AD}$, $DEP_{CA}$, $DEP_{AC}$, $DEP_{BA}$, $DEP_{AB}$. This graph 29 consists of 4 singleton strong component nodes D, E, C, and B after the singleton strong component A is removed. Component A is the (only) best fragmenter for the strong component of FIG. 3, since removal of A results in the largest remaining strong component having only a single member. For example, upon removal of component A, component B, C, D and E do not have dependency arcs that go though one or more additional components and return to themselves. Therefore, each strong component is formed of a single member, with the largest strong component remaining having a value of one. However, if component B is removed, the largest strong component remaining consists of components A, D, E, and F, having a size of four. If component C is removed, the largest strong component remaining is A, B having a size of two. If either component D or component E is removed, the largest strong component is A, B, C, which has a size of three. Therefore, the smallest of the largest remaining strong components upon removal of a given component is one and its associated component is component A, which is therefore the best fragmenter for this strong component. The complete list of fragmenters for this strong component, and their associated sizes, is then: A(1), C(2), D(3), E(3), B(4). B is therefore the worst fragmenter for this strong component.

FIG. 5 illustrates a dependency graph of the strong component 28 upon removal of the dependency arc ($DEP_{CA}$) from component C to component A. The dependency arc $DEP_{CA}$ has been identified as the dependency refactor location for refactoring or simplifying the graph to provide a lower system NCCD than would occur by refactoring of any of the other dependency arcs in the dependency graph. The actual calculations are somewhat complicated, but well known in the art, and have been left out for the sake of simplicity. However, it can be seen from the graph that removal of dependency arc $DEP_{CA}$ breaks the largest dependency cycle having the largest number of dependency levels in the graph and would likely result in a larger reduction in testing efforts and the overall system NCCD compared to the refactoring of other dependency arcs.

Figure 6:
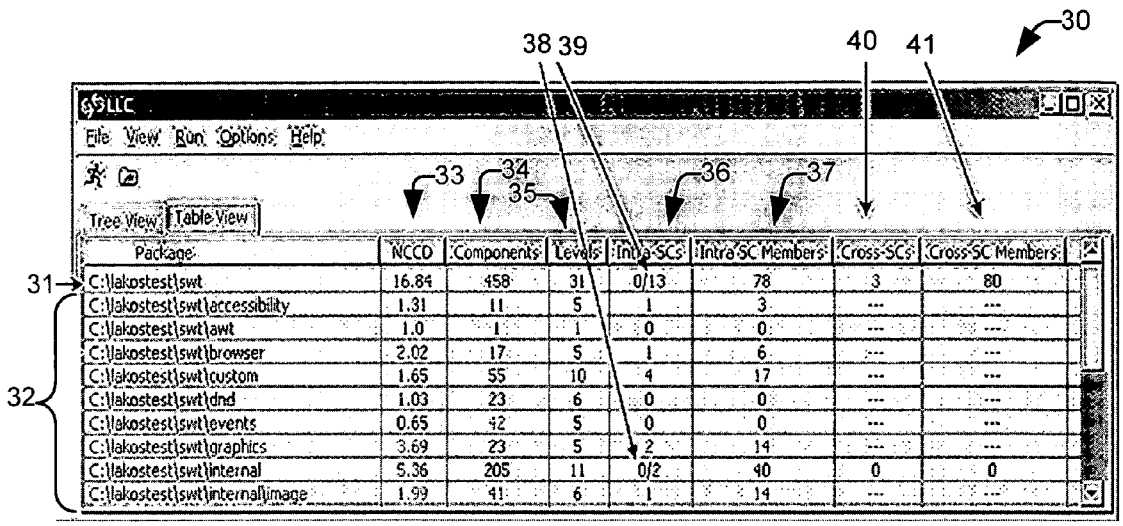
FIG. 6 illustrates a portion of a table view of the graphical user interface of FIG. 1 in accordance with an aspect of the present invention.

FIG. 6 illustrates a portion of a table view 30 of the GUI 24 in accordance with an aspect of the present invention. The table view 30 displays metrics associated with a software system having components distributed over a complete tree of one or more directories and subdirectories. The table view 30 includes the top directory path 31 and sub-directory paths 32 and a plurality of dependency metrics (e.g., Lakos metrics) associated with directories or parent packages and sub-directories or child packages. A user can scroll down to find additional sub-directory paths, and external libraries (at level 0, not shown). The metric values for parent packages (i.e., directories with one or more child directories) include cumulative totals across all files (i.e., cross-package or cross-directory). A blue color can be provided to indicate a caution for cross-package metric values that exceed a predetermined threshold. The metric values for packages that have no child directory are calculated based on files in that directory only (i.e., intra-package). A red color can be provided to indicate an intra-package metric exceeds a predetermined threshold. Predetermined thresholds can be selected based on a particular implementation and user preferences.

The metric values include overall NCCD values 33 for each directory, the total number of components 34 in each directory, the largest number of component dependency levels 35 in each directory. The dependency metric values also include intra-directory strong components 36 and intra-directory strong component members 37. For parent packages, the intra-directory strong component values include both the number of strong components within the current directory (first digit) 38 and the cumulative total of intra-package strong components in all sub-directories (second digit) 39. The dependency metric values also include cross-directory strong components 40 and cross-directory strong component members 41. The cross-directory or cross-package values are only applicable for parent packages that have child directories. The table view 30 is a mechanism that provides a developer with an overview of general problem areas in the design. The above-identified metric values can be monitored or reported on a web server, for example, to determine if a given metric value exceeds a predetermined threshold, such as for example, the number of component dependency levels for a given directory.

Figure 7:
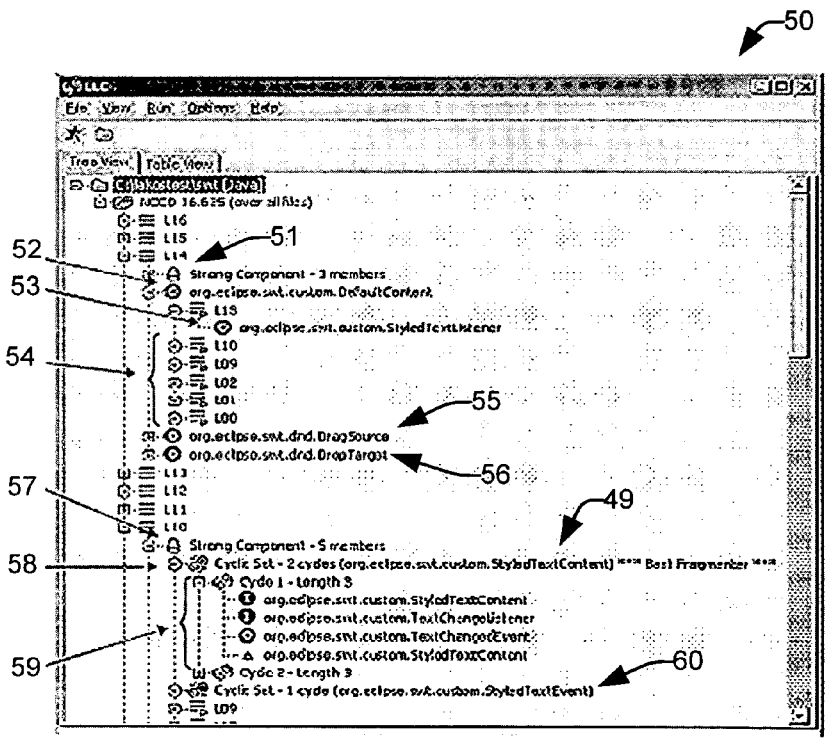
FIG. 7 illustrates a portion of a tree view of the graphical user interface of FIG. 1 in accordance with an aspect of the present invention.

FIG. 7 illustrates a portion of a tree view 50 of the GUI 24 in accordance with an aspect of the present invention. The tree view 50 provides a display of a hierarchical, levels-based view depicting component relationships associated with a software system having components distributed across a complete tree of one or more directories and subdirectories. The tree view graphically depicts dependencies between components (e.g., classes, data structures and/or interfaces) at each level. The tree view 50 displays one-way dependencies for each component, dependencies on other components and external packages at lower levels. The tree view 50 also identifies strong components with associated members including corresponding covering cyclic sets and cycles, dependencies on other components and external packages at lower levels. FIG. 7 shows how a best fragmenter component for each strong component can be identified. Not shown is the complete list of fragmenters from best to worst. The tree view 50 also shows non-cyclic dependencies and external (level 0) dependencies. It is to be appreciated that the tree view can also be programmed to display the best simplifier dependency arcs, and the complete list of simplifier dependency arcs from best to worst.

Although not shown in FIG. 7, the tree view 50 can be configured to display dependency definitions that provide an explanation of the reason for each dependency in the system (e.g., a call to a method in a component, an instantiation of a component, etc.). The tree view 50 can be used by the software developer, software designer, or software architect to quickly pinpoint and understand the extent and characteristics of problem areas in the design. Although not illustrated, an inverse tree view can be provided that displays for each given component, all components that are dependent upon the given component.

As illustrated in the tree view 50, at level 14 (L14) a strong component 51 is identified by a lock icon. The strong component 51 includes three members: a class labeled DefaultContent 52 that depends on a class StyledTextListener 53 at level 13, and also on other lower level components 54 (whose names are not shown until the tree is expanded by the user clicking on the associated plus-sign tree view node) at levels L10, L09, L02, L01 and L00. A "+" sign in a box next to the level, strong component or software component (i.e., class, interface or data structure) provides an indication that the associated level, strong component or software component has not been fully expanded to view the composition of strong components and/or software components and corresponding dependencies on other levels and components. A "−" sign indicates that the view has been expanded to view this information. The strong component 51 also includes the classes DragSource 55 and DropTarget 56, all at level 14. (Recall that all singleton components contained within a non-singleton strong component are always assigned the same level number. Note that the class DragSource 55 and DropTarget 56 reside in the subdirectories "dnd", while the class DefaultContent 53 resides in subdirectory "custom". Strong components whose dependency arcs cross directories, as in this case, are especially difficult to identify and analyze without the aid of a software tool, such as illustrated in one embodiment of the present invention.

At level 10 (L10), another strong component 57 is identified, this one with 5 members. The strong component 57 is covered by two cyclic sets, the first cyclic set consisting of two elementary cycles each containing three components, and the second consisting of one cycle, whose length is not shown. A common component node or vertex is a component within a cycle that is common with at least one other cycle in the cyclic set. The first cyclic set 59 includes a first cycle (Cycle 1) that has a length 3 consisting of interface StyledTextContent, class TextChangeListener and class TextChangedEvent all residing in subdirectory "custom" with the common node being class TextChangeListener and a second cycle (Cycle 2) of length 3 that has not been expanded. The strong component 57 includes a second cyclic set StyledTextEvent 60 having a single cycle that has not been expanded. The singleton strong component StyledTextContent 49 has been identified as the best fragmenter. Although not illustrated, the display can at lower levels show the exact nature of all library or other external dependencies associated with the analyzed system.

Figure 8:
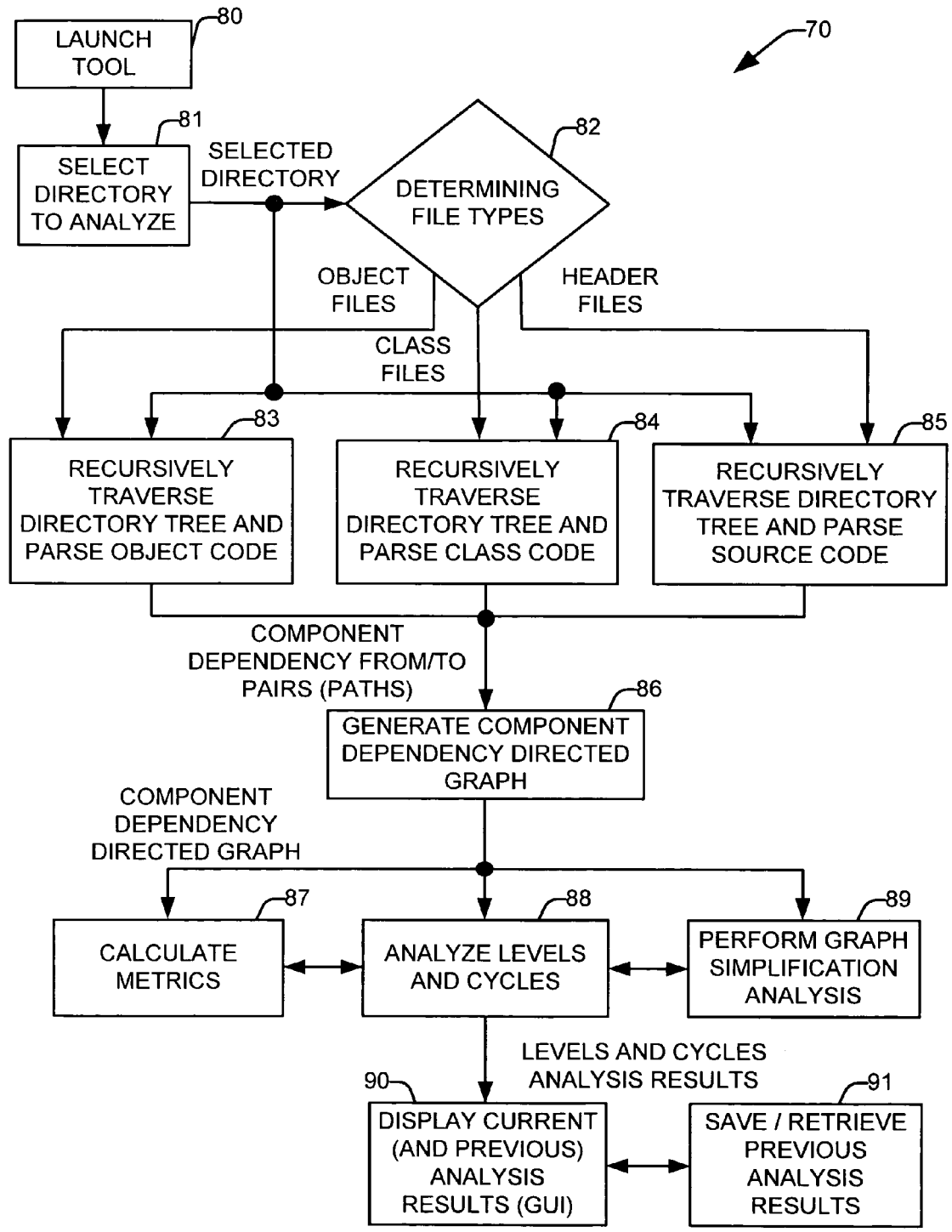
FIG. 8 illustrates a method for identifying and displaying dependencies among a plurality of software components in accordance with an aspect of the present invention.

In view of the foregoing structural and functional features described above, a method will be better appreciated with reference to FIG. 8. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer or a computer network as one or more integrated circuits or circuit boards containing one or more microprocessors), software (e.g., as executable instructions running on one or more processors of a computer system), or any combination thereof.

FIG. 8 illustrates an embodiment of a method for identifying and displaying dependencies of a software system in accordance with an aspect of the present invention. The method begins at 80 with launching of the identifying, analyzing and displaying tool. The identifying, analyzing and displaying tool can be a software algorithm that executes on a computer readable medium and identifies, analyzes, and displays dependencies in a software system. At 81, one or more directories containing the software system are selected, for example, by a user of the tool, or a script. At 82, the tool determines which types of files that reside in the selected entire directory tree. The tool then selects one or more analysis paths based on the types of files residing in the selected directory tree. It is to be appreciated that the directory can contain one or more different types of code files, and a given code file can include portions that are of different code types, such that the different code files and code types within a file may follow different paths. A first path 83 is selected for files that are linkable object code (e.g., C/C++ ".o" object files), a second path 84 is selected for compiled JAVA code (e.g., JAVA byte code ".class" files) and a third path 85 is selected for source code (e.g., non-compiled code, such as C/C++ header and/or source ".h, .c, .cpp", files). It is to be appreciated that these examples of object code, class code and the source code are just of few of the types of software components and that a variety of other component types can be analyzed in accordance with an aspect of the present invention.

If the method selects the first path, the method proceeds to 83 to recursively traverse a selected directory tree and parse object code to generate component dependency from/to pairs (paths). Object code analysis will reveal the actual run-time dependencies required by the design. If the method selects the second path, the method proceeds to 84 to recursively traverse a selected directory tree and parse ".class" compiled JAVA byte code to generate component dependency from/to pairs (paths). If the method selects the third path, the method proceeds to 85 to recursively traverse a selected directory tree and parse source code to generate component dependency from/to pairs (paths). For C/C++ header files, for example, the header file analysis will reveal the compile time dependencies. This option provides a superset of object file analysis accounting for both actual run-time dependencies and as well as those compile-time dependencies that may exist in header files. It is to be appreciated that some apparent dependencies derived in this way may not be essential, since, for example, a software component (e.g., data structure, class) may include in a header file other header files that are not actually required by the implementation for compilation or execution.

At 86, a component dependency directed graph is generated from the component dependency from/to pairs provided from 83, 84 and 85. At 87, metrics are calculated from the component dependency graph, as shown in FIG. 1. At 88, the dependency levels, strong components, dependency cycles, strong component covering cycle sets, non-cyclic dependencies and external dependencies are determined based on the component dependency directed graph. A set of covering cycles can be identified for each strong component with the aid of a shortest path algorithm for directed graphs. At 89, a graph simplification analysis routine is performed on the component dependency graph to determine one or more refactor locations or one or more simplification locations. The graph simplification analysis routine can determine, for example, the ordered list of fragmenters and the ordered dependency arc simplifiers list based on minimizing the overall system NCCD if the dependency arc were removed. At 90, the calculated metrics, the levels and cycles analysis results, and the graph simplification analysis results are displayed including current and previous results in a GUI. The GUI can include, for example, a table view, a tree view and an inverse tree view. At 91, the method can save/restore previous analysis results views, such as before and after a simplification or refactoring step, as the user desires.

Figure 9:
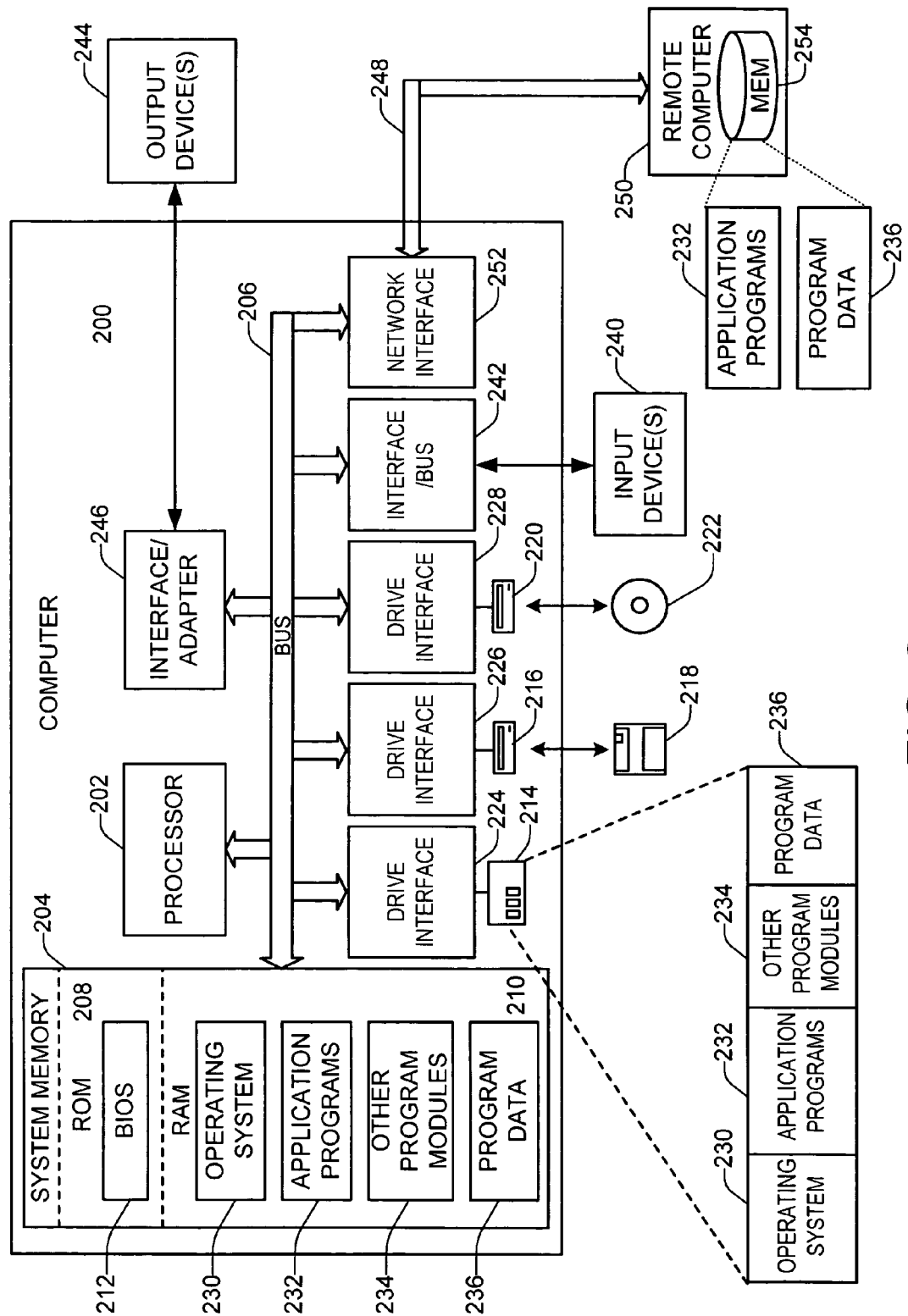
FIG. 9 illustrates an embodiment of a computer system.

FIG. 9 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236. The one or more application programs can include the system and methods for identifying and displaying dependencies previously described in FIGS. 1-8.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method, executed on a processing unit, for identifying and displaying dependencies in software components of a software system, the method comprising:
   parsing a plurality of software components over one or more directories and generating a plurality of dependency pairs associated with the plurality of software components;
   generating a component dependency directed graph from the plurality of dependency pairs;
   traversing the component dependency directed graph to identify non-cyclic dependencies, cyclic dependencies and cyclic sets associated with strong components and system component dependency levels associated with the software components;
   displaying a tree view illustrating a dependency tree of the identified dependencies over the identified component dependency levels; and
   identifying a dependency arc in at least one strong component that when removed from the dependency directed graph provides the best reduction in a normalized cumulative component dependency (NCCD) value.

2. The method of claim 1, further comprising identifying an ordered list of dependency arcs in the dependency directed graph that if removed can provide a reduction in an overall system normalized cumulative component dependency (NCCD) value.

3. The method of claim 1, further comprising determining a best fragmenter, the best fragmenter being the component that when removed compared to individual removal of each of the other components has the smallest remaining largest strong component of the plurality of largest remaining strong components associated with respective individual removal of each of the other components.

4. The method of claim 1, further comprising determining for each non-singleton strong component within the component dependency directed graph an ordered list of singleton strong components that are ranked by the size of the remaining largest strong component if the selected singleton strong component were removed from the strong component under consideration.

5. The method of claim 1, further comprising displaying dependency definitions that provide an explanation of a given dependency for one or more dependencies of at least one strong component in the tree view.

6. The method of claim 1, wherein the traversing the dependency directed graph further comprises selecting an unexamined node in at least one strong component and determining a successor node that has the shortest path back to the unexamined node to mark a covering cycle, until each unmarked covering cycle associated with the unexamined node has been marked and repeats this for each unexamined node in the at least one strong component.

7. The method of claim 1, wherein the components comprise at least one of object files, header files, and class files.

8. The method of claim 1, further comprising generating a plurality of dependency metrics from the directed graph in a table view.

9. The method of claim 8, wherein the plurality of dependency metrics are displayed in a table view, and comprise at least one of normalized cumulative component dependency (NCCD) values for each directory, the number of software components in each directory, the number of component level dependencies for each directory, intra-directory strong components comprising both the number of strong components within the current directory and the cumulative total of sub-directory strong components for parent directories, intra-directory strong component members, cross-directory strong components and cross-directory strong component members.

10. The method of claim 1, further comprising displaying an inverse tree view that displays software components that are dependent on a given software component for one or more software components.

11. A computer system for identifying and displaying dependencies, the computer system comprising:
a memory for storing computer executable instructions;
a processor for accessing the memory and executing computer executable instructions, the computer executable instructions comprising:
a dependency parser that parses components of a system with dependencies and generates a plurality of dependency from/to pairs associated with the components;
a component dependency graph generator that generates a dependency directed graph from the plurality of component dependency from/to pairs;
a component levels and cycles analyzer that traverses the dependency directed graph to identify dependencies, strong components and component dependency levels associated with the component dependency directed graph;
a graphical user interface that provides a tree view illustrating a dependency tree of the identified dependencies over the identified component dependency levels; and
a graph simplification analyzer that identifies an ordered list of dependency arcs in the dependency directed graph that if removed can provide a reduction in an overall system normalized cumulative component dependency (NCCD) value.

12. The computer system of claim 11, wherein the graph simplification analyzer determines for each non-singleton strong component within the component dependency directed graph an ordered list of singleton strong components that are ranked by the size of the remaining largest strong component if the selected singleton strong component were removed from the strong component under consideration.

13. The computer system of claim 12, wherein the graphical user interface displays the ordered list of fragmenters for each strong component, and also identifies the fragmenters in a leveled tree view of the system with dependencies.

14. The computer system of claim 11, wherein the graphical user interface displays detailed dependency explanations for each dependency arc within the component dependency directed graph for the system with dependencies.

15. The computer system of claim 11, wherein the graphical user interface further can display an inverse tree view that displays the plurality of components that are dependent on a given component for one or more components and for one or more external libraries required by the system with dependencies.

16. The computer system of claim 11, wherein the component levels and cycles analyzer employs a shortest path algorithm in traversing each non-singleton strong component within the component dependency directed graph in order to identify a set of covering cycles for each strong component that favors short cycles over longer ones, and covers each dependency arc in each strong component in the system with dependencies.

17. The computer system of claim 16, wherein the component levels and cycles analyzer for each non-singleton strong component in the system with dependencies selects an unexamined node and successively determines and marks sets of distinct covering cycles by finding the shortest path from each successor node of the unexamined node back to the unexamined node, until each unmarked cycle associated with the unexamined node has been marked and repeats this for each unexamined node in each non-singleton strong component.

18. The computer system of claim 11, wherein the dependency generator parses at least one of object code files, source code files, and compiled JAVA class code files.

19. The computer system of claim 11, further comprising a metric engine that generates a plurality of dependency metrics from the dependency directed graph, the plurality of dependency metrics being displayed in a table view by the graphical user interface.

20. The computer system of claim 19, wherein the components are associated with a software system, and the plurality of dependency metrics comprise both intra-directory and cross-directory metrics.

21. The computer system of claim 20, wherein the plurality of dependency metrics comprise normalized cumulative component dependency (NCCD) values for each directory, the number of components in each directory, the number of component level dependencies for each directory, intra-directory strong components comprising both the number of strong components within the current directory and the cumulative total of sub-directory strong components for parent directories, intra-directory strong component members, cross-directory strong components and cross-directory strong component members.

22. The computer system of claim 11, wherein the component levels and cycles analyzer traverses the directed graph to identify non-cyclic dependencies, external dependencies, cyclic dependencies and cyclic sets associated with each strong component and system component dependency levels associated with the system components, which are displayed in the tree view of the graphical user interface.

23. The computer system of claim 11, wherein components of a system parsed by the dependency parser are software components distributed over one or more directories, wherein the dependency parser parses object code, source code, and class code.

24. A non-transitory computer readable medium having computer executable components comprising:
a dependency parser that parses system components associated with a system with dependencies and generates a plurality of dependency pairs associated with the system components;
a component dependency graph generator that generates a dependency directed graph from the plurality of system component dependency pairs;
a component levels and cycles analyzer that traverses the directed graph to identify non-cyclic dependencies, external dependencies, cyclic dependencies and cyclic sets associated with strong components and system component dependency levels associated with the system components, the component levels and cycles analyzer employs a shortest path algorithm in traversing each non-singleton strong component within the component dependency directed graph in order to identify a set of covering cycles for each strong component that favors short cycles over longer ones, and covers each dependency arc in each strong component in the system with dependencies;
a metric engine that generates a plurality of dependency metric values from the dependency directed graph;
a graphical user interface that provides selectability between a tree view illustrating a dependency tree of identified dependencies over the identified system component dependency levels and a table view that illustrates the plurality of metric values; and a graph simplification analyzer that identifies an ordered list of dependency arcs in the dependency directed graph that if removed can provide a reduction in an overall system normalized cumulative component dependency (NCCD) value.

25. The non-transitory computer readable medium of claim 24, wherein the graph simplification analyzer determines for each non-singleton strong component within the component dependency directed graph an ordered list of singleton strong components that are ranked by the size of the remaining largest strong component if the selected singleton strong component were removed from the strong component under consideration.

26. The non-transitory computer readable medium of claim 24, wherein the system components are software components distributed over one or more directories, and the dependency generator parses at least one of object code, source code, and class code.

27. The non-transitory computer readable medium of claim 24, wherein the system components are software components distributed over one or more directories and wherein the plurality of dependency metrics comprise both intra-directory and cross-directory metrics.

28. The non-transitory computer readable medium of claim 27, wherein the plurality of dependency metrics comprise normalized cumulative component dependency (NCCD) values for each directory and for the overall system associated with the one or more directories, the number of system components in each directory, the number of system component level dependencies for each directory, intra-directory strong components comprising both the number of strong components within the current directory and the cumulative total of sub-directory strong components for parent directories, intra-directory strong component members, cross-directory strong components and cross-directory strong component members.

29. The non-transitory computer readable medium of claim 24, wherein the component levels and cycles analyzer for each non-singleton strong component in the system with dependencies selects an unexamined node and successively determines and marks sets of distinct covering cycles by finding the shortest path from each successor node back to the unexamined node, until each unmarked cycle associated with the unexamined node has been marked and repeats this for each unexamined node in each non-singleton strong component.

30. The non-transitory computer readable medium of claim 24, wherein the graphical user interface further comprises an inverse tree view that displays components that are dependent on a given component for one or more components.

* * * * *